United States Patent [19]
Bliznak

[11] Patent Number: 4,745,653
[45] Date of Patent: May 24, 1988

[54] WIPER/SCRAPER/WASHER BLADE FOR WINDOWS ON TRANSPORTATION MEANS

[76] Inventor: Bedrich V. Bliznak, 362 Rindge Ave., Apt. 3B, Cambridge, Mass. 02140

[21] Appl. No.: 890,733

[22] Filed: Jul. 28, 1986

[51] Int. Cl.⁴ .............................................. B60S 01/38
[52] U.S. Cl. ................................ 15/250.04; 15/250.4; 15/250.41
[58] Field of Search ........... 15/250.04, 250.41, 250.42, 15/250.03; D12/155

[56] References Cited

U.S. PATENT DOCUMENTS

| | | | |
|---|---|---|---|
| 3,417,421 | 12/1968 | Retke | 15/250.41 |
| 3,631,561 | 1/1972 | Aszkenas | 15/250.41 |
| 4,192,038 | 3/1980 | Klein et al. | 15/250.04 X |
| 4,293,975 | 10/1981 | Ainsworth | 15/250.41 |
| 4,317,251 | 3/1982 | Priesemuth | 15/250.42 X |
| 4,567,621 | 2/1986 | Alley, Jr. | 15/250.41 |
| 4,616,060 | 10/1986 | Killgoar, Jr. | 15/250.42 X |

FOREIGN PATENT DOCUMENTS 1316781 5/1973 United Kingdom .
2029691 3/1980 United Kingdom .

Primary Examiner—Stuart S. Levy
Assistant Examiner—Steven M. Dubois
Attorney, Agent, or Firm—Bedrich V. Bliznak

[57] ABSTRACT

A multiple edged blade has at least two blade edges contacting a window surface simultaneously. A washing sponge in between the edges receives liquid from a central conduit. Various smooth and serrated planes adjacent to each edge provide alternative working edges for different conditions of the window. A hard pointed edge cuts through ice. A sharply angled forward edge of the blade scrapes. A centrally positioned sponge washes. A rearwardly pointing rear edge wipes. A rotatable triple edged blade with multiple types of surfaces provides versatility for use in any weather.

14 Claims, 2 Drawing Sheets

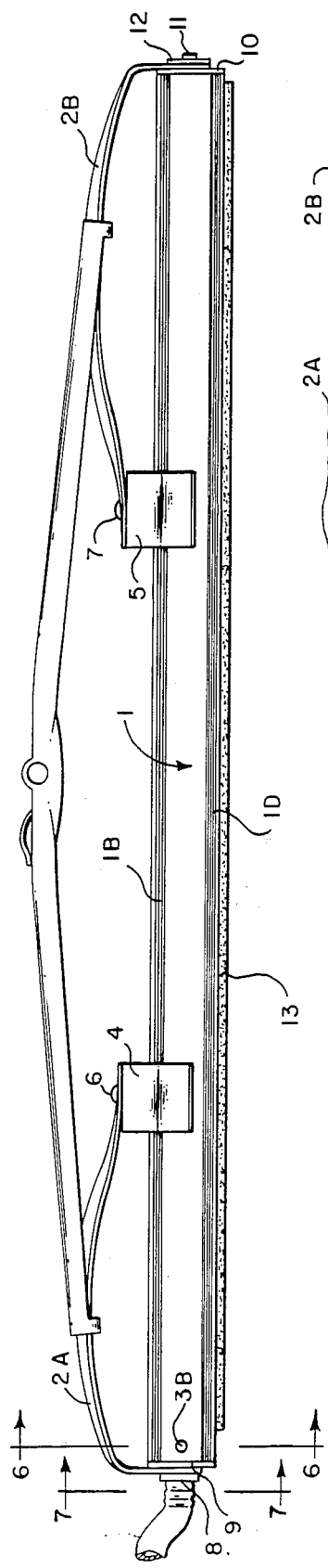
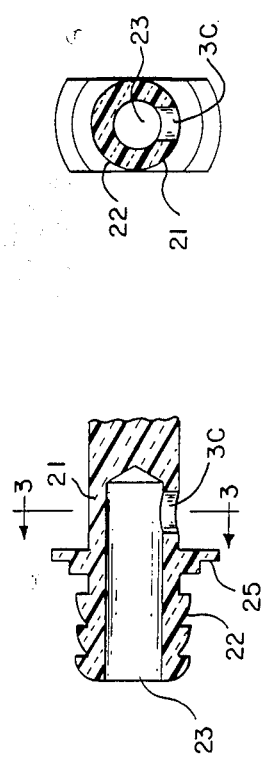
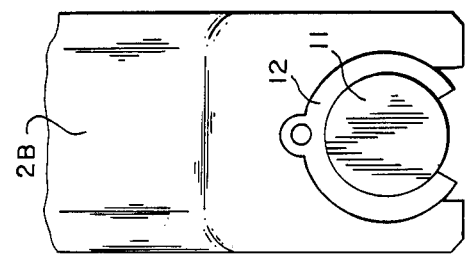
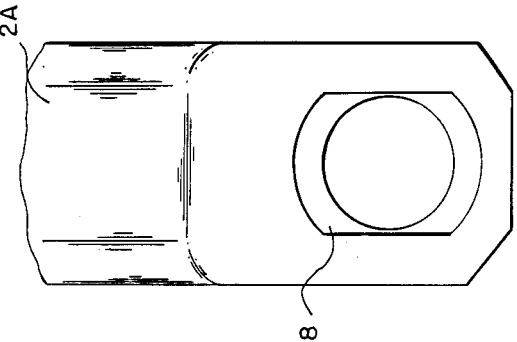
Fig. 1
Fig. 2
Fig. 3
Fig. 4
Fig. 5

4,745,653

WIPER/SCRAPER/WASHER BLADE FOR WINDOWS ON TRANSPORTATION MEANS

BACKGROUND OF THE INVENTION

1. Technical Field

The present invention relates to window cleaning blades for transportation devices and in particular to a combined wiper/scraper blade having two opposing contacting edges and a liquid applying sponge-like washer between the edges for combined wiping, scraping and washing of windows.

2. Background Art

One of the most annoying and at times very hazardous conditions of any transportation means is obscured or completely blocked visibility through the windows. Hard rain, snow, ice, bugs, road dirt and other visibility impeding matter pile up on the windshield and other windows.

Current blades provide solely a wiping function and are generally fabricated of resilient rubber with the primary intended use of wiping the window clear of a moderate amount of rain and possibly very tiny particles which might be dissolved or suspended in the rain. The rubber blades do not perform well in heavy downpours of rain and generally fail to remove any ice or caked-on snow, bugs, dirt or other debris unless a considerable amount of liquid is squirted on the window to dissolve the solid particles, and melt frozen coatings. Usually in severe weather conditions, the windows must be scraped by hand to remove the offending matter.

Windows of road vehicles, trains and boats present a great hazard when blocked for visibility, often requiring the stopping of the transportation means to scrape off the window. Aircraft are especially hazardness when windows are coated with vision-obscuring matter, because it is not possible to stop the aircraft in mid-air to scrape the windows.

Conventional window washers provide a simple squirting means to direct liquid onto the window surface and rely simply on the wiping action of the blade to clean the window surface.

Conventional wiper blades deteriorate very rapidly and often don't function well under speed because the wind tends to lift the blades away from the surface of the window.

When weather conditions are moderate with a light rain, conventional rubber wiper blades tend to create a very annoying squeaking sound on the window because the light rain is not sufficient lubrication between the blade and the window.

SUMMARY OF THE INVENTION

The present invention provides a blade with two opposing relatively stiff blade edges contacting the window simultaneously and facing in opposite directions so that the forwardly pointing edge serves a scraping function and the rearwardly pointing edge serves a wiping function, creating a combination wiping/scraping blade. A liquid applying sponge positioned between each pair of blade edges serves as a window washing means with direct contact to the window, creating a combination wiping/scraping/washing blade. Such a blade can clean a window of any obscuring elements including heavy rain, snow, ice, dirt, bugs or any other matter which might coat the window.

Providing three blade edges with various combinations of edge hardness and adjacent surface configurations creates a variably adjustable blade to meet a wide variety of weather conditions.

A double blade held securely against a window by a tensioned spring holds firmly and operates efficiently under all wind and speed conditions.

Fabricating the blade of a low friction plastic, such as Teflon or Nylon eliminates squeaking noises when the amount of moisture on the window is low. An extruded triangular-shaped blade of Teflon or Nylon provides longitudinal resilience to conform under pressure to the shape of the window while providing the lateral stiffness to scrape effectively without distorting.

BRIEF DESCRIPTION OF THE DRAWINGS

These and other details and advantages of the invention will be described in connection with the accompanying drawings which are furnished merely by way of illustration but not in limitation of the invention, and in which drawings:

FIG. 1 is a side elevational view of the wiper/scraper/washer blade mounted on a windshield wiper arm;

FIG. 2 is a cross-sectional view of an end of the central support of the blade having a central conduit for liquids;

FIG. 3 is a cross-sectional view of the conduit end portion taken through 3—3 of FIG. 2;

FIG. 4 is an enlarged end view of a detail of the invention showing the connection of the central support to the windshield wiper arm;

FIG. 5 is an enlarged end view of an opposite end of the invention showing the connection of the central support to the windshield wiper arm;

BEST MODE FOR CARRYING OUT THE INVENTION

Figure 6:
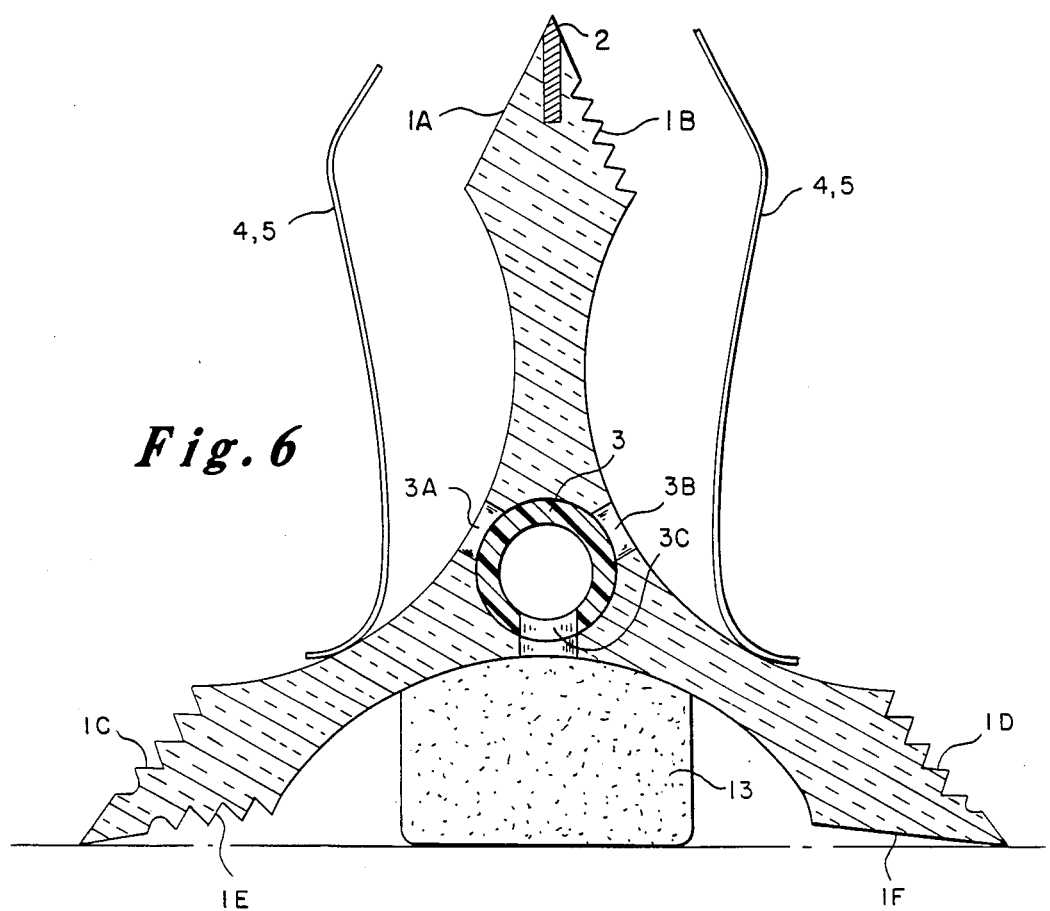
FIG. 6 is an enlarged cross-sectional view taken through 6—6 of FIG. 1 showing the three edges of the blade.

In FIGS. 1 and 6 the wiper/scraper/washer blade 1 comprises an elongated central supporting structure having three elongated blade edges extending equiangularly from the central structure. Each blade edge comprises a sharply pointed edge and two planar surfaces adjacent to each edge with one on each side of the edge, 1A and 1B on the upper edge, 1C and 1E on the lower left edge, and 1D and 1F on the lower right edge. A blade edge may have a hardened ice breaking inserted point 2.

Each different type of surface serves a different function for various weather conditions. A flat surface, such as 1A and 1F serve, when facing toward the window as ideal wiping surfaces and when the flat surfaces are facing away from the window as ideal snow plows heading into the snow. The serrated surfaces, such as 1B, 1C, 1E and 1D serve as ideal scraping surfaces for ice, encrusted snow, bugs, road dirt and other solid matter. The blade is rotated around a central liquid conduit 3 to position the paired blades as desired to meet the requirements of the existing weather conditions.

A sponge rubber 13 or other pourous pad may be secured adhesively between a pair of blade edges to serve as a washing means for the window with liquid squirted into the sponge 13 through an opening 3C between the blade and the central liquid conduit 3. As the blade is rotated into other positions each of the other holes 3A and 3B between the other pairs of blade edges may be matched up with the opening in the central conduit.

Tensioned spring-like arms 4 and 5 are secured by rivets 6 and 7 to leaf-type spring arms 2A and 2B from the windshield wiper arm, thereby placing pressure on the blade to force it against the window. In addition, the central conduit 3 may have spring-like characteristics or may be accompanied by a spring member in the central support. Conforming to a curved window requires considerable longitudinal bending capacity of the blade. Laterally the relatively broad base created by the two opposing blade edges creates a lateral stability particularly in cooperation with the tension members pressing on the two edges to resist distortion upon encountering the matter on the window and resist the forces of wind and maintain the blade against the window.

In FIGS. 1, 2 and 3, a tube 14 fits over a protruding end 21 of central blade support and liquid is forced through the tube into an opening 23 in the support and through the hole 3C into the space between the two edges to wash the window. A series of ridges 22 serve to hold the tube 14 onto the protruding end.

Figure 7:
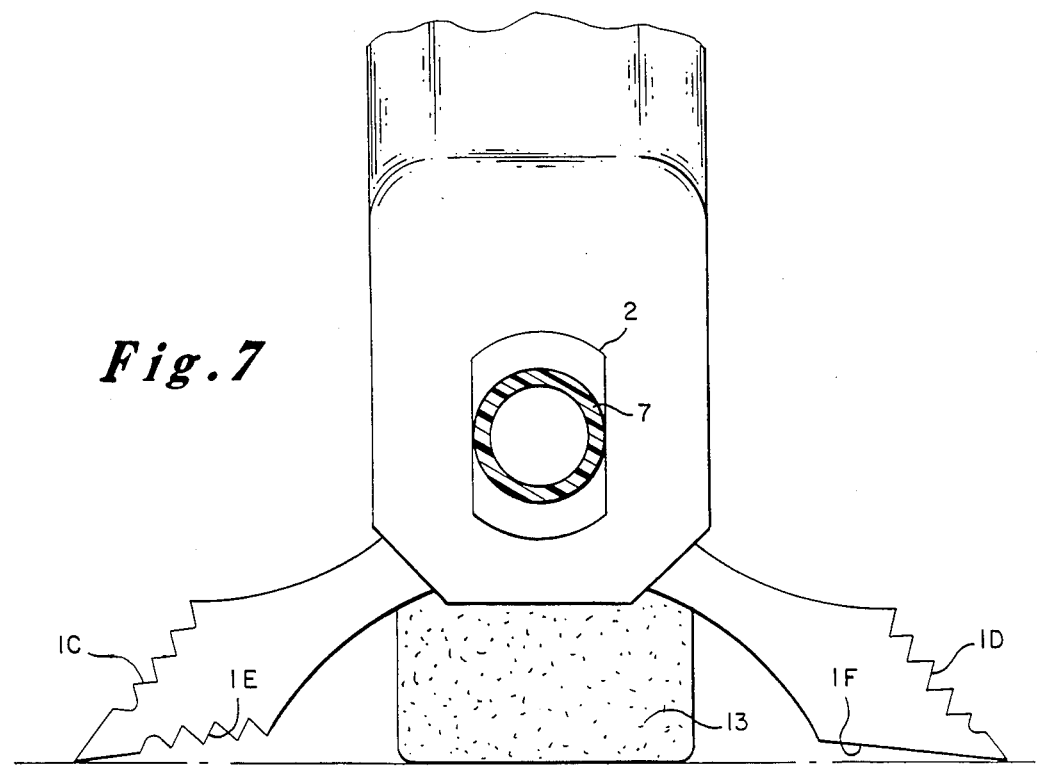
FIG. 7 is an enlarged end view in partial section taken through 7—7 of FIG. 1 showing the end details.

In FIGS. 4 and 7 an opening 2 in an end of the spring arm 2A from the wiper arm is provided with two straight parallel edges to receive a protrusion 8 from the end of the support member having two mating straight parallel edges, so that the protruding end of the support fits within the spring arm opening without rotating. Pulling in the blade clears the protrusion 8 of the spring arm opening to permit turning of the blade to a desired position. In FIG. 5 at an opposite end of the blade, extending from the blde, a protruding post 11 with a groove fits through a hole in the spring arm 2B and is secured in place by an O-ring 12.

The blade may be extruded from a low surface tension material such as Teflon or Nylon for the necessary longitudinal resilience, lateral stiffness and resistance to the weather and chemicals. The central conduit may be formed as an opening in the material or as an inserted conduit formed of plastic, metal or other liquid retaining materials. A spring-like metal member may be inserted into the central support core of the blade for greater spring.

It is understood that the preceding description is given merely by way of illustration but not in limitation of the invention and that various modifications may be made thereto without departing from the spirit of the invention as claimed.

I claim:

1. A combination including a wiper/scraper blade and holding arm mechanism for windows on transportation devices having a dual function for both wiping and scraping a window; wherein the windshield wiper/scraper blade and holding arm mechanism comprise:

an elongated blade element comprising along the length of the blade element a central support and at least two spaced sharp elongated edges positioned with each elongated edge directed away from the other laterally on opposing sides of the central support, so that as the blade moves laterally in a back and forth sweeping motion over a window surface, the two elongated edges alternate forward positions, so that as the blade sweeps in a first direction, a first elongated edge pointing forwardly in the direction of motion, acts as a scraper, in advance of a second trailing elongated edge pointing rearwardly away from the direction of motion of the blade, which second elongated edge acts as a wiper, and as the blade sweeps back in an opposite second direction, the second elongated edge leads in a forwardly pointing direction acting as a scraper and the first elongated edge trails in a rearwardly pointing direction acting as a wiper;

a tensioning means for holding the wiper/scraper blade against a window;

and a reversing motion means of controlling the motion of the blade across the window;

and wherein the wiper/scraper blade comprises three elongated edges spaced equiangularly around the central support, thereby forming a series of three paired sets of elongated edges and the wiper/scraper blade may be rotated to position any of the three paired sets against the window;

and wherein the central support comprises a tubular liquid conducting opening through the central support with a single opening at one end of the central support facing toward the window and the blade further comprises an end opening between each adjacent pair of elongated edges, wherein each opening between elongated edges aligns with the central support opening when the pair of elongated edges having the end opening is positioned toward the window, thereby admitting liquid onto the window.

2. The invention of claim 1 wherein the wiper/scraper blade is mounted on a front windshield of a transportation device in a substantially vertically position with the blade pivoting from a bottom end, and the opening is in the bottom end of the central support to take advantage of the upwardly directed force of wind and centrifugal force created by the pivoting blade.

3. The invention of claim 1 wherein the wiper/scraper blade is mounted on a rear window of a transportion device in a substantially vertical position, and the opening is in the top of the central support to take advantage of the downwardly directed force of drag on the window.

4. The invention of claim 1 further comprising a sponge means mounted between the two elongated edges to apply the liquid to the window and wash the window.

5. The invention of claim 1 wherein at least one of the elongated edges comprises a hardened sharp edge for cutting through ice, hardened snow, bugs and other solids.

6. The invention of claim 1 wherein the blade further comprises adjacent to at least one of the elongated edges a series of serrations parallel to the elongated edge on a side of the blade adjacent to the window for scraping through encrusted ice and snow, bugs and other solids.

7. The invention of claim 6 wherein the wiper/scraper blade further comprises a liquid dispensing means between the elongated edges and the serrations further comprise spaced series of openings transversely across the serrations to admit liquid through the serrations.

8. The invention of claim 1 wherein the blade further comprises adjacent to at least one of the elongated edges a smooth inclined surface on a side of the blade away from the window to act as a snow plow.

9. The invention of claim 1 wherein each elongated edge is attached to the central support by a thin web of resilient material and the tensioning means comprises an arm which exerts pressure on the blade forcing it against the window and the thin web allows flexing of the elongated edges against the window.

10. The invention of claim 1 wherein each of the three elongated edges comprises a unique combination of different edge structures and different adjacent blade surfaces for different window cleaning functions used selectively depending upon the weather conditions.

11. The invention of claim 1 wherein the tensioning means of holding the wiper/scraper blade against the window comprises an arm from a motor driven gear, which arm is attached to the wiper/scraper blade by a spring tensioning means.

12. The invention of claim 1 wherein the blade is formed of a material having resilience to allow bending longitudinally to conform to a curved window of a transportation device and yet providing lateral stability to resist distortion of the blade.

13. The invention of claim 12 wherein the blade is extruded of a resilient weather resistant plastic material from any of a group of such plastics having low friction surface properties, including Teflon and Nylon, thereby eliminating any squeaking noise of the blade against a window.

14. The invention of claim 1 wherein each elongated edge comprises an edge surface angled so that when a pair of elongated edges contact a flat surface without pressure on the blade, the edge surface is angled upwardly away from the flat surface less than one degree.

* * * * *